(12) United States Patent
Maeta

(10) Patent No.: US 9,376,045 B2
(45) Date of Patent: Jun. 28, 2016

(54) VEHICLE SEAT

(75) Inventor: Toshihiko Maeta, Takamatsu (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 432 days.

(21) Appl. No.: 13/483,497

(22) Filed: May 30, 2012

(65) Prior Publication Data

US 2012/0313418 A1 Dec. 13, 2012

(30) Foreign Application Priority Data

Jun. 8, 2011 (JP) .................................. 2011-128132

(51) Int. Cl.
| | | |
|---|---|---|
| *A47C 7/02* | (2006.01) | |
| *B60N 2/68* | (2006.01) | |
| *B60N 2/28* | (2006.01) | |
| *B60N 2/36* | (2006.01) |

(52) U.S. Cl.
CPC .............. *B60N 2/686* (2013.01); *B60N 2/2809* (2013.01); *B60N 2/36* (2013.01); *B60N 2205/35* (2013.01)

(58) Field of Classification Search
CPC .................................... A47C 3/12; A47C 5/12
USPC ............................ 297/452.14, 452.15, 452.65
See application file for complete search history.

(56) References Cited

U.S. PATENT DOCUMENTS

| | | | | |
|---|---|---|---|---|
| 6,491,346 B1 * | 12/2002 | Gupta et al. | ............. | 297/452.65 |
| 6,679,558 B2 * | 1/2004 | Adams et al. | ............. | 297/452.65 |
| 7,128,373 B2 * | 10/2006 | Kurtycz et al. | ........... | 297/452.15 |
| 7,891,740 B2 * | 2/2011 | Boes | ......................... | 297/452.18 |
| 8,061,779 B2 * | 11/2011 | Nakagaki et al. | ........... | 297/452.2 |
| 2003/0062759 A1 * | 4/2003 | Gupta et al. | ............. | 297/452.65 |
| 2003/0075968 A1 * | 4/2003 | Gupta et al. | ............. | 297/452.18 |
| 2004/0155513 A1 * | 8/2004 | Gupta et al. | ............. | 297/452.65 |
| 2005/0082896 A1 * | 4/2005 | Gupta et al. | ............. | 297/452.65 |
| 2006/0103228 A1 * | 5/2006 | Gupta et al. | ............. | 297/452.65 |
| 2007/0278842 A1 * | 12/2007 | Ikai et al. | ................. | 297/452.14 |
| 2009/0289491 A1 | 11/2009 | Nakagaki et al. | | |
| 2012/0261956 A1 | 10/2012 | Nasshan et al. | | |
| 2012/0267936 A1 | 10/2012 | Nakagaki et al. | | |

FOREIGN PATENT DOCUMENTS

| | | |
|---|---|---|
| CN | 101585331 | 11/2009 |
| DE | 102005045781 | 4/2007 |

(Continued)

OTHER PUBLICATIONS

Chinese Office action dated Mar. 20, 2014. along with an English-language translation thereof.

(Continued)

*Primary Examiner* — David E Allred
*Assistant Examiner* — Alexander Harrison
(74) *Attorney, Agent, or Firm* — Greenblum & Bernstein, P.L.C.

(57) ABSTRACT

In a vehicle seat structured such that stress is applied to a frame member of an upright seat back on a virtual diagonal line that connects one side of an upper portion of the seat back with another side of a lower portion of the seat back in response to tension received from a band member, the frame member is formed by a first member being connected to a second member, and one member from among the first member and the second member crosses the virtual diagonal line. The one member is more rigid than the other member that is different from the one member, and the other member is lighter than the one member.

14 Claims, 4 Drawing Sheets

(56) References Cited

FOREIGN PATENT DOCUMENTS

| | | |
|---|---|---|
| DE | 102006033513 | 1/2008 |
| DE | 102006036915 | 2/2008 |
| JP | 57-204225 | 6/1981 |
| JP | 58-126763 | 8/1983 |
| JP | 03-64827 | 6/1991 |
| JP | 2001-314272 | 11/2001 |
| JP | 2004-229688 | 8/2004 |
| JP | 2010-188906 | 9/2010 |
| JP | 2011-93342 | 5/2011 |
| WO | 2009/149177 | 12/2009 |
| WO | 2010/088384 | 8/2010 |
| WO | 2011/047748 | 4/2011 |

OTHER PUBLICATIONS

Japanese Official Action for JP App. No. 2011-128132 dated Nov. 4, 2014, along with an English-language translation thereof.
Germany Office action, dated Mar. 9, 2015 along with an English translation thereof.
Japan Office action, dated Jun. 9, 2015 along with an English translation thereof.
Chinese Official action dated Sep. 10, 2014, along with an English-language translation thereof.

\* cited by examiner

VEHICLE SEAT

INCORPORATION BY REFERENCE

The disclosure of Japanese Patent Application No. 2011-128132 filed on Jun. 8, 2011 including the specification, drawings and abstract is incorporated herein by reference in its entirety.

BACKGROUND OF THE INVENTION

1. Field of the Invention

The invention relates to a vehicle seat provided with a frame member, an engaging portion that is able to engage with a vehicle cabin structure, and a retaining portion that is able to retain a band member.

2. Description of Related Art

One such vehicle seat that is well known is provided with a seat cushion and a seat back (see Japanese Patent Application Publication No. 2001-314272 (JP 2001-314272 A). The seat back is connected in a raisable manner to the seat cushion. The seat back has a frame member, an engaging portion, and a retaining portion. The frame member is a generally rectangular frame-shaped member, and includes an upper pipe that forms an upper portion when upright, a lower pipe that forms a lower portion, and connecting pipes. The frame member is made of highly rigid metal. The connecting pipes connect the upper pipe to the lower pipe, and may be arranged in the center and on both sides of the seat back. Also, the engaging portion is a portion formed recessed in the thickness direction of the seat, and may be arranged on one side of the upper portion of the frame member when the seat back is upright. In the related art, a rod member is provided on the vehicle cabin structure and extends in the seat width direction. The seat back is able to be supported by the vehicle cabin structure by fitting the rod member into the engaging portion while the seat back is raised.

An object such as a child seat may be attached to a sitting side of the vehicle seat. A strap member (a band member) is attached to an upper portion of the child seat, and may be attached to a retaining portion on a back surface of the seat back. In the related art, after the child seat is arranged on the sitting side of the seat, the strap member is extended from a shoulder (i.e., the other side of the upper portion of the frame member) of the seat back to the rear surface of the seat back, and fixed to the retaining portion. The other side of the upper portion of the frame member is the side of the upper portion of the frame member on which the engaging portion is not provided.

Here, with the seat structure described above, stress may be applied to the frame member when the strap member is strained or the like when the vehicle is involved in a collision. That is, when tension is placed on the strap member, stress (i.e., bending stress) is consequently applied to the frame member of the upright seat back on a virtual diagonal line that connects the one side of the upper portion of the seat back with the other side of the lower portion of the seat back. At this time, with the related art, the frame member is prevented to the greatest extend possible from bending by the stress described above because the entire frame member is made of highly rigid metal.

SUMMARY OF THE INVENTION

With this kind of seat structure, there is a need to make the seat as light as possible in view of fuel efficiency of the vehicle and manufacturing cost reduction and the like. However, with the structure of the related art, the entire frame member is highly rigid and heavy, so it is an unsuitable structure for making the vehicle seat lighter. Of course, lightweight metal can also be used for the frame member, but in this case, the desired rigidity for the frame member would be unable to be obtained. In view of the foregoing problem, the invention thus provides a vehicle seat in which the frame member is made lighter while maintaining the rigidity of the frame member to the greatest extent possible.

One aspect of the invention relates to a vehicle seat that includes a seat cushion and a seat back. The seat back includes a frame member that is frame-shaped and forms a seat frame, an engaging portion that engages with a vehicle cabin structure, a retaining portion that retains a band member, and a reclining shaft. The seat back is connected in a raisable manner to the seat cushion by the reclining shaft of a lower portion of the seat back. The seat back is supported by the vehicle cabin structure by the engaging portion provided on one side of an upper portion of the seat back being engaged with the vehicle cabin structure while the seat back is raised. Also, the band member that receives a weight of another member while the other member is arranged on a sitting side of the seat back is retained by the retaining portion while being extended from the upper portion of the seat back to a back surface of the seat back. Moreover, in this aspect, stress (i.e., bending stress) is applied to the frame member of the upright seat back on a virtual diagonal line that connects the one side of the upper portion of the seat back with the other side of the lower portion of the seat back, in response to tension received from the band member. With this kind of seat structure, it is desirable to be able to reduce the weight of the frame member while maintaining rigidity to the greatest extent possible.

Also, in this aspect, the frame member is formed by a first member being connected to a second member, and one member from among the first member and the second member has a portion that crosses the virtual diagonal line (i.e., a portion to which bending stress is applied). Here, in this aspect, the one member is more rigid than another member that is different from the one member, and the other member is lighter than the one member. Making the one member (i.e., the portion to which bending stress is applied) highly rigid in this way enables the rigidity of the frame member to be maintained to the greatest extent possible. Also, making the other member (i.e., the portion to which bending stress is not applied) lighter than the one member enables the weight of the overall frame member to be reduced.

The vehicle seat in the aspect described above may also be such that the frame member includes a first frame portion that is adjacent to the engaging portion, and a second frame portion that is narrower than the first frame portion, and the first frame portion is formed by the first member being connected to the second member. With the vehicle seat having this structure, the first frame portion that is relatively large is made lighter while maintaining the rigidity to the greatest extent possible, so the vehicle seat is able to be reduced in weight.

The vehicle seat according to this aspect of the invention enables the frame member to be made lighter, while maintaining the rigidity to the greatest extent possible. Also, the vehicle seat is able to be reduced in weight.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
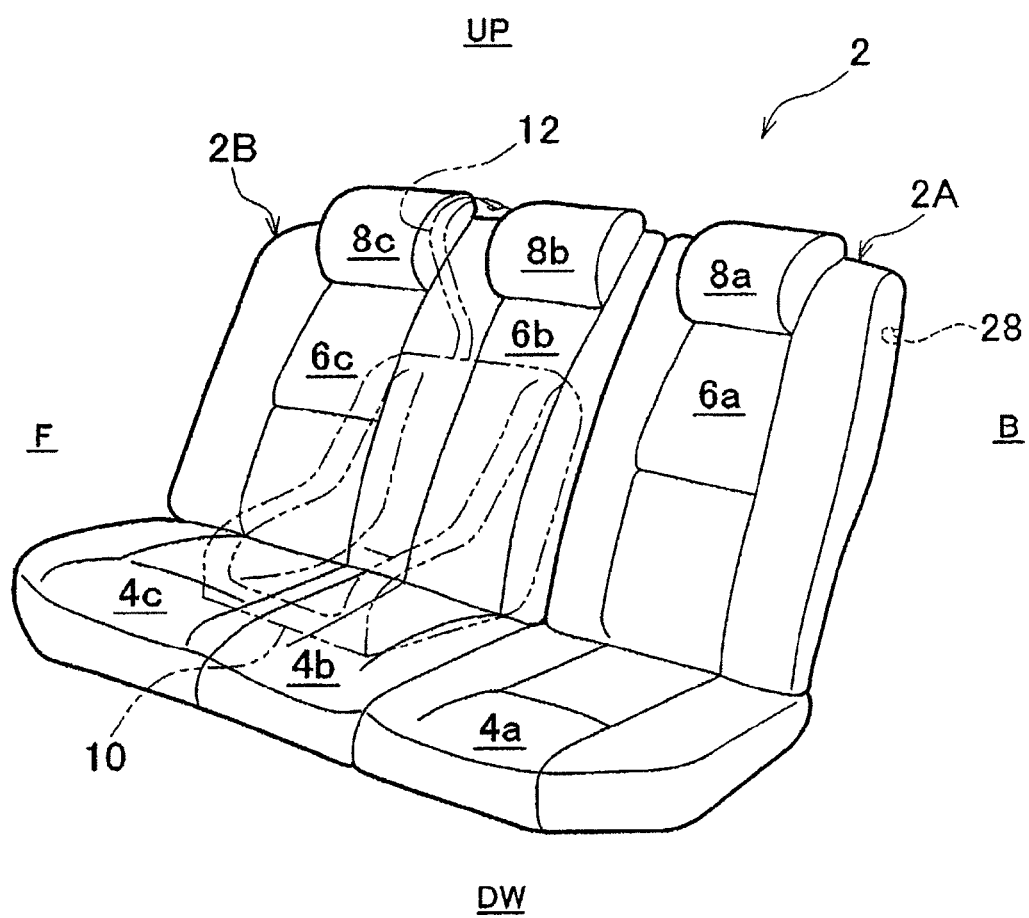
FIG. 1 is a transparent perspective view of a vehicle seat according to an example embodiment of the invention.

Hereinafter, example embodiments of the invention will be described with reference to FIGS. 1 to 4. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat, as appropriate.

A vehicle seat 2 in FIG. 1 has a first seat portion 2A and a second seat portion 2B, and is able to seat a plurality of occupants. The first seat portion 2A is a portion that is relatively wide (large), and has a plurality of various seat structure members (seat cushions 4a and 4b, seat backs 6a and 6b, and headrests 8a and 8b). Also, the second seat portion 2B is a portion that is relatively narrow (small), and has only one of each seat structure member (a seat cushion 4c, a seat back 6c, and a headrest 8c).

The seat back 6a to 6c are able to be raised and reclined with respect to the seat cushions 4a to 4c, and include a plurality of frame members 6F, engaging portions 28, and retaining portions 22 (see FIGS. 1 and 2) (hereinafter these members and portions will be referred to in the singular when possible to facilitate understanding). Also, a child seat 10 is able to be arranged on the sitting side of the seat backs 6a to 6c. The child seat 10 is one example of another member. Also in this example embodiment, the seat backs 6a to 6c are supported by a vehicle cabin structure 14 by engaging the engaging portion 28 with the vehicle cabin structure 14 while the seat backs 6a to 6c are raised. Also, after the child seat 10 has been arranged on the sitting side of the seat backs 6a to 6c, a strap member 12 that extends from the child seat 10 is attached to the retaining portion 22. The strap member 12 is one example of a band member.

With this kind of seat structure, there is a need to make the seat as light as possible in view of fuel efficiency of the vehicle and manufacturing cost reduction and the like. However, with the structure described above, stress is applied to the frame member 6F of the upright seat backs 6a to 6c on a virtual diagonal line DL that connects one side of the upper portion of the seat backs 6a to 6c with the other side of a lower portion of the seat backs 6a to 6c, due to tension placed on the strap member 12 (see FIGS. 1 and 2). Therefore, with the seat structure of this example embodiment, it is desirable to be able to make the frame member 6F lighter while maintaining the rigidity to the greatest extent possible. Hence, in this example embodiment, the frame member 6F is made lighter while maintaining the rigidity to the greatest extent possible by the structure described below.

The child seat 10 (an example of another member) can be arranged on the sitting side of the seat, and includes the strap member 12 (one example of a band member) (see FIG. 1). The strap member 12 is a band member that receives the weight of the child seat 10. The strap member 12 of this example embodiment is made of fabric, and is attached to an upper portion of the child seat 10. A generally J-shaped resin member, not shown, may be provided on an end portion of the strap member 12 (see FIG. 2).

Figure 2:
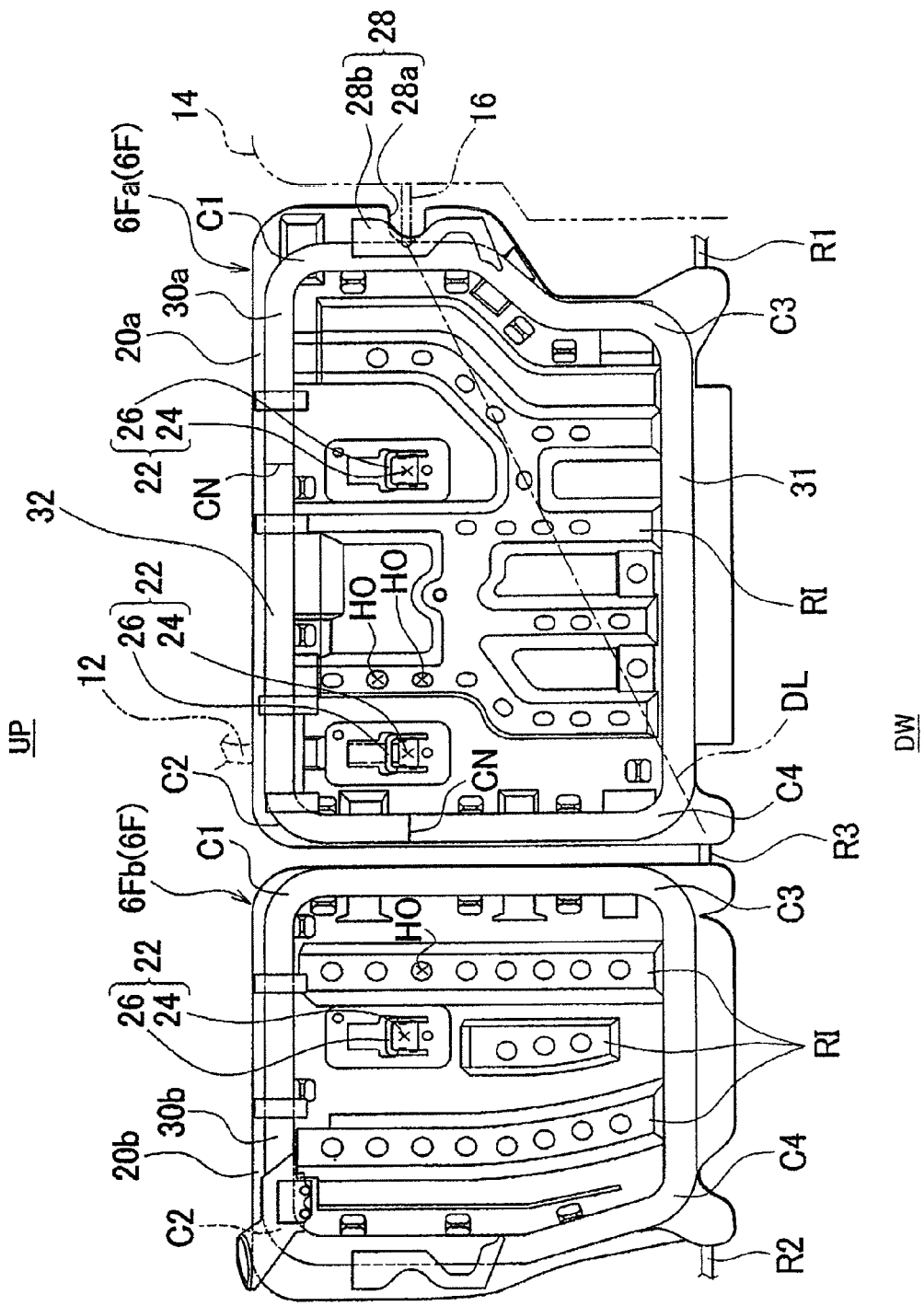
FIG. 2 is a front view of a frame member.

The vehicle cabin structure 14 is a structure that is adjacent to the vehicle seat 2, and has a striker 16 (see FIG. 2). For example, the vehicle cabin structure 14 is a vehicle cabin wall surface or a wheelhouse. The striker 16 is a rod member that extends from the vehicle cabin structure 14 toward the vehicle seat 2 (i.e., the seat back 6a), and is able to face the back surface of the seat back 6a when the seat back 6a is upright. In this example embodiment, the upright seat backs 6a to 6c are able to be supported by the vehicle cabin structure 14 by keeping the striker 16 engaged with (i.e., fit into) the engaging portion 28 while the seat backs 6a to 6c are raised.

Figure 3:
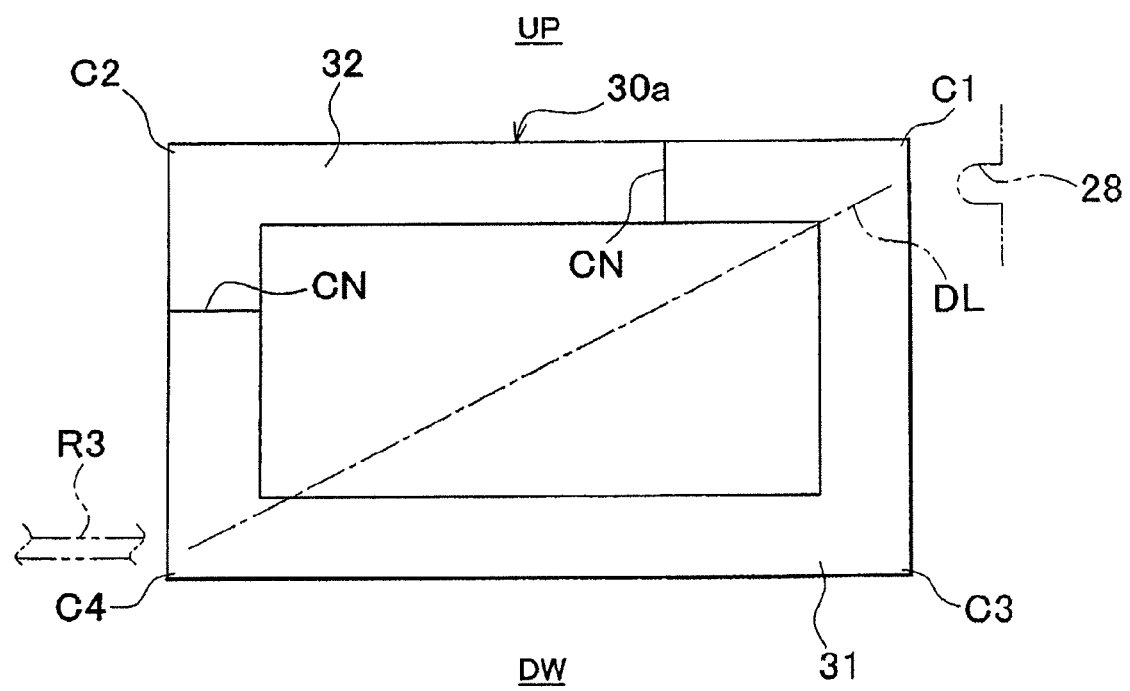
FIG. 3 is a schematic front view of the frame member.
Figure 4:
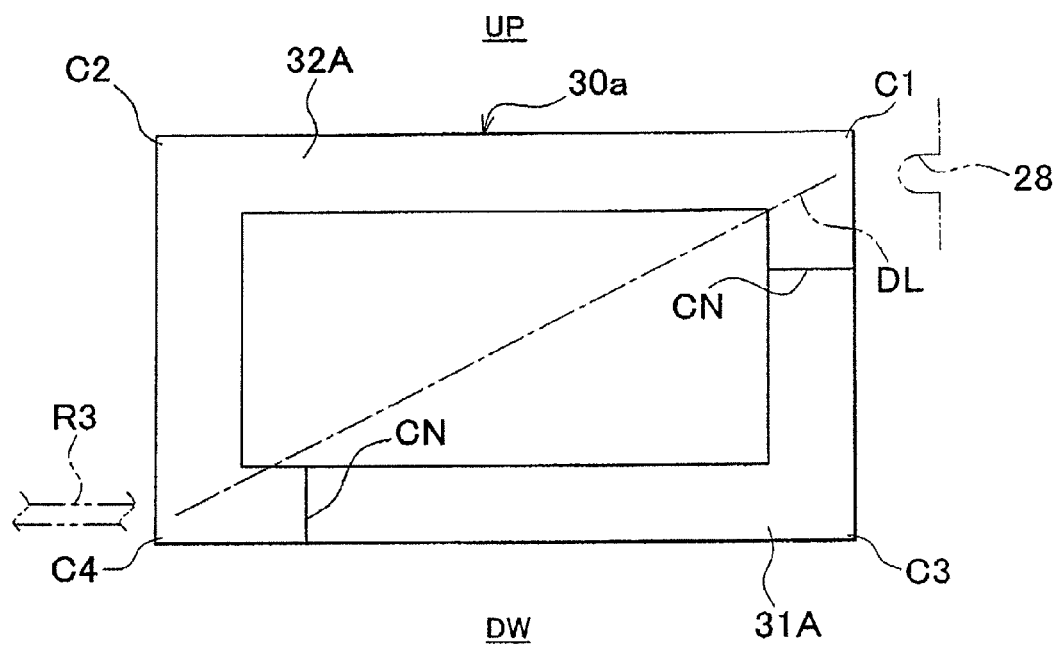
FIG. 4 is a schematic front view of a frame member according to a modified example of the example embodiment.

The frame member 6F forms a seat frame, and includes a first frame portion 6Fa, a second frame portion 6Fb, and reclining shafts (R1, R2, and R3) (see FIGS. 2 and 3). The first frame portion 6Fa is a generally rectangular member, and forms the frame of the seat backs 6a and 6b. The length of the first frame portion 6Fa in the vehicle width direction is wide. For example, if the width dimension of the vehicle cabin is 100, the width dimension of the first frame portion 6Fa is approximately 60. Also, the second frame portion 6Fb is a generally square member, and forms the frame of the seat back 6c. The length of the second frame portion 6Fb in the vehicle width direction is narrower than the length of the first frame portion 6Fa in the vehicle width direction. In this example embodiment, only the first frame portion 6Fa (that is large) is made lighter while maintaining the rigidity to the greatest extent possible (contributes to reducing the weight of the vehicle seat 2). The second frame portion 6Fb has generally the same basic structure as the first frame portion 6Fa. Therefore, corresponding structure will be denoted by corresponding reference characters, and detailed descriptions of that structure will be omitted.

The reclining shafts are rod members that extend in the seat width direction, and are the center of rotation when the seat backs 6a to 6c are reclined and raised. In this example embodiment, a plurality of reclining shafts (i.e., a first shaft portion R1, a second shaft portion R2, and a third shaft portion R3) may be provided on a lower portion of the seat backs 6a to 6c. At this time, the first shaft portion R1 is attached to one side of the lower portion of the first frame portion 6Fa, and the second shaft portion R2 is attached to the other side of the lower portion of the second frame portion 6Fb. The third shaft portion R3 is attached extending between the other side of the lower portion of the first frame portion 6Fa and the one side of the lower portion of the second frame portion 6Fb.

The first frame portion 6Fa has a panel 20a, a pipe 30a (i.e., a first member 31 and a second member 32), the retaining portion 22, and the engaging portion 28. The panel 20a is a flat (generally rectangular) plate member that is shaped following the outer shape of the seat backs 6a and 6b, and is made of metal or resin. The panel 20a in this example embodiment has a plurality of ribs RI and a plurality of holes HO. The plurality of ribs RI are protruding portions (reinforcing portions) that extend out in the thickness direction of the panel 20a, and extend in the vertical direction of the seat when the upright seat backs 6a to 6c are upright. Also, the plurality of holes HO are through-holes that are formed along each rib RI, and are provided to lighten the panel 20a (for the sake of convenience, reference characters denote only some of the holes in FIG. 2).

The retaining portion 22 is a portion that is able to retain the strap member 12, and includes a window portion 24 and a retaining portion 26. The window portion 24 is an opening (generally square) that passes through the panel 20a. The retaining portion 26 is a rod member that cuts across the window portion 24 in the seat width direction. In this example embodiment, a pair of retaining portions 22 are formed on the upper portion of the panel 20a (i.e., in positions corresponding to the rear surface of the seat backs 6a and 6b). An end portion of the strap member 12 is able to be retained by either one of these retaining portions 22 (i.e., the retaining portion 26).

The engaging portion 28 is a portion that is able to engage with the vehicle cabin structure 14, and includes a recessed portion 28a and a support bracket 28b. The engaging portion 28 of this example embodiment may be provided on one side (i.e., the seat back 6a side) of the upper portion of the panel 20a. The recessed portion 28a is a cutout portion (generally sideways U-shaped) provided on the one side of the upper portion of the panel 20a, and may be bored in the seat width direction. Also, the support bracket 28b is a plate-shaped member that is arranged on the sitting side of the panel 20a, and is attached crossing above and below the recessed portion 28a. In this example embodiment, the striker 16 abuts against the support bracket 28b while the seat backs 6a to 6c are raised and the striker 16 is engaged with (i.e., fitted into) the recessed portion 28a. As a result, the upright seat backs 6a to 6c are able to be supported by the vehicle cabin structure 14 by keeping the striker 16 engaged with the recessed portion 28a.

The pipe 30a is a generally rectangular (hollow) pipe member that has a plurality of corners (C1 to C4) and portions (i.e., the first member 31 and the second member 32) that will be described later (see FIGS. 2 and 3). The first corner C1 is a corner that forms an apex on the one side of the upper portion of the pipe 30a, and the second corner C2 is a corner that forms an apex on the other side of the upper portion of the pipe 30a. Also, the third corner C3 is a corner that forms an apex on the one side of the lower portion of the pipe 30a, and the fourth corner C4 is a corner that forms an apex on the other side of the lower portion of the pipe 30a. Also, the first corner C1 is arranged adjacent to the engaging portion 28, and the space C4 is arranged adjacent to the third shaft portion R3 and in a position opposite the first corner C1. The pipe 30a may be fixed to the sitting side of the panel 20a by welding or the like. Stress is applied to the pipe 30a on a virtual diagonal line DL that connects the one side of the upper portion (i.e., the engaging portion 28) of the seat backs 6a and 6b with the other side of the lower portion (i.e., the third shaft portion R3) of the seat backs 6a and 6b as a result of tension being placed on the strap member 12.

The first member 31 forms a portion (on the lower side) of the pipe 30a, and has a portion that crosses the virtual diagonal line DL. The first member 31 of this example embodiment is a portion that forms the first corner C1, the third corner C3, and the fourth corner C4, and forms a generally inverse L shape (when viewed from the front). Also, the first member 31 has a portion (a portion to which bending stress is applied) that crosses the virtual diagonal line DL that connects the engaging portion 28 with the third shaft portion R3. The first member 31 is more rigid than the second member 32 (that will be described later), and may be made of any of a variety of highly rigid metals. For example, in this example embodiment, the first member 31 may be made with highly rigid steel pipe (JIS steel pipe standard: STKM17A, φ 28, t 2.0; weight 1200 to 1300 g/m; Young's modulus: 190 to 210 GPa). Here, if the first member 31 and the second member 32 are made with steel pipe of the same material, the rigidity can be increased by making the thickness dimension (the average thickness) of the first member 31 greater (i.e., thicker) than that of the second member 32, or making the diameter dimension (i.e., the sectional area) of the first member 31 greater than that of the second member 32, or the like. Also, the first member 31 may also be made to have greater structural rigidity than the second member 32 by providing rib structures on the inside of the first member 31 or the like.

The second member 32 forms another portion (the upper side) of the pipe 30a, and may be connected to the first member 31. The first member 31 of this example embodiment is a portion that forms the second corner C2, and is another portion (generally sideways L-shaped) of the pipe 30a other than the first member 31. The second member 32 is lighter than the first member 31, and may be formed of any of a variety of light metals. For example, in this example embodiment, the second member 32 may be formed with lightweight steel pipe (JIS steel pipe standard: STKM13A, φ 28, t 1.2; weight: 700 to 800 g/m; Young's modulus: 190 to 210 GPa).

In this example embodiment, the pipe 30a is made by connecting the first member 31 and the second member 32 together. The method by which these members are connected may be, for example, swaging when the first member 31 and the second member 32 are pipes of the same diameter. For example, the end portion of the first member 31 is swaged and the diameter is reduced. Then the end portion of the first member 31 is inserted into the second member 32. Next, the connecting portion CN is welded, thus enabling the first member 31 and the second member 32 to be connected together.

Referring to FIGS. 1 to 3, the child seat 10 is arranged on the sitting side of the seat back 6b. Next, one end of the strap member 12 that extends from the child seat 10 is extended from the upper portion of the seat back 6b to the back surface of the seat back 6b and attached to the retaining portion 22 there. With this type of seat structure, for example, when the vehicle is involved in a collision or the like, the upright seat backs 6a and 6b may receive tension from the strap member 12. At this time, stress (i.e., bending stress) is applied to the first frame portion 6Fa of the upright seat backs 6a and 6b on the virtual diagonal line DL that connects the one side of the upper portion (i.e., the engaging portion 28) of the seat backs 6a and 6b with the other side of the lower portion (i.e., the third shaft portion R3) of the seat backs 6a and 6b.

At this time, in this example embodiment, the first member 31 that is the portion to which bending stress is applied is highly rigid, and will thus deform minimally from external force (i.e., the rigidity of the frame member 6F is able to be maintained to the greatest extent possible). Also, the second member 32 is lighter than the first member 31, so the weight of the first frame portion 6Fa can be reduced. Therefore, according to this example embodiment, the first frame portion 6Fa can be made lighter while maintaining the rigidity to the greatest extent possible. Moreover, with this example embodiment, the first frame portion 6Fa that is relatively large is able to be made lighter while maintaining the rigidity to the greatest extent possible, and therefore contributes to making the vehicle seat 2 lighter.

Next, a modified example of the example embodiment described above will be described. In this modified example, a second member 32A forms an upper side of the pipe 30a, and a first member 31A forms a lower side of the pipe 30a (see FIG. 4). The second member 32A (that is generally sideways L-shaped when viewed from the front) of this modified example is a portion that forms the first corner C1, the second corner C2, and the fourth corner C4. Also, in this modified example, the second member 32A has a portion that crosses the virtual diagonal line DL that connects the engaging portion 28 with the third shaft portion R3. Also, the second member 32A is more rigid than the first member 31A, and may be made with highly rigid steel pipe, for example. Also, the first member 31A is a portion that forms the third corner C3, and is another portion (having a generally inverted L-shape) of the pipe 30a other than the second member 32A.

The first member 31A is lighter than the second member 32A, and may be made with lightweight steel pipe, for example. In this modified example as well, the second member 32A that is a portion to which bending stress is applied is more rigid than the first member 31A, and will thus deform minimally from external pressure (i.e., the rigidity of the frame member 6F is able to be maintained to the greatest extent possible). Also, the first member 31A that is a portion to which bending stress is not applied is lighter than the second member 32A, so the weight of the first frame portion 6Fa can be reduced.

The vehicle seat 2 according to the example embodiment is not limited to the example embodiment described above. That is, various other example embodiments are also possible. (1) In the example embodiment described above, the child seat 10 is given as an example of the other member, but an occupant may also be an example of the other member. In this case, the seat belt serves as the band-shape member. (2) In the example embodiment described above, the structures of the retaining portion 22, the engaging portion 28, and the third shaft portion R3 are described, but the number and positions and the like of these portions are not intended to be limited. (3) Also in the example embodiment described above, the shape of the frame member 6F (i.e., the first frame portion 6Fa and the second frame portion 6Fb) is described, but the shape of this member may be modified as appropriate according to the structure of the vehicle seat. Also, the first frame portion 6Fa may also be divided into three or more sections. In this case, one or a plurality of each of the first portion and the second portion may be formed. (4) Also in the example embodiment described above, the vehicle seat 2 provided with the first seat portion 2A and the second seat portion 2B (i.e., a seat on which a plurality of occupants can be seated) is described, but the structure of the vehicle seat 2 is not limited to this. For example, the vehicle seat may also have only the first seat portion. Also, the vehicle seat may have only the second seat portion, and the structure of the example embodiment may be applied to this seat portion.

What is claimed is:

1. A vehicle seat comprising:
    a seat cushion; and
    a seat back that includes:
        a frame member that defines a seat frame;
        an engaging portion that is provided on one side of an upper portion of the seat back and engages with a vehicle cabin structure;
        a retaining portion that retains a band member, wherein the band member receives a weight of an object arranged on a seating side of the seat back; and
        a reclining shaft that connects the seat cushion and a lower portion of the seat back in a raisable manner, wherein
    the seat back is supported by the vehicle cabin structure by the engaging portion being engaged with the vehicle cabin structure while the seat back is raised,
    the band member is configured to be retained by the retaining portion while being extended from the upper portion of the seat back to a back surface of the seat back,
    when the seat back is in an upright position, and in response to tension received from the band member, stress is applied to the frame member of the seat back on a virtual diagonal line that connects the one side of the upper portion of the seat back with an opposite side of the lower portion of the seat back, and
    the frame member includes a first member and a second member that are connected to each other, the first member crosses the virtual diagonal line, and the first member is more rigid than the second member, and the second member is lighter than the first member,
    each linear portion of the more rigid member is more rigid than each linear portion of the lighter member,
    the engaging portion is provided on the first member, and when the seat back is in the upright position, and in response to the tension received from the band member, stress is applied to the engaging portion provided on the first member and a corner portion of the same first member.

2. The vehicle seat according to claim 1, wherein the frame member includes a first frame portion that is adjacent to the engaging portion, and a second frame portion that is narrower than the first frame portion, and the first frame portion is formed of the first member and the second member.

3. The vehicle seat according to claim 1, wherein the frame member is made of metal.

4. The vehicle seat according to claim 1, wherein the one member has a rib.

5. The vehicle seat according to claim 1, wherein an average thickness of the one of the first member and the second member is thicker than an average thickness of the other of the first member and the second member.

6. The vehicle seat according to claim 1, wherein a sectional area of the one of the first member and the second member is greater than a sectional area of the other of the first member and the second member.

7. The vehicle seat according to claim 1, wherein the band member is a seat belt.

8. The vehicle seat according to claim 1, wherein the object is a child seat.

9. The vehicle seat according to claim 1, wherein the one of the first member and the second member crosses both the one side of the upper portion of the seat back and the opposite side of the lower portion of the seat back of the virtual diagonal line.

10. A vehicle seat comprising:
    a seat cushion; and
    a seat back, wherein
    the seat back includes a frame member, an engaging portion that is provided on one side of an upper portion of the seat back and engages with a vehicle cabin structure, a retaining portion that retains a band member, and a reclining shaft,
    the seat back is supported by the vehicle cabin structure by the engaging portion being engaged with the vehicle cabin structure,
    the frame member forms a seat frame, and
    the frame member includes a first member and a second member, the first member crosses a virtual diagonal line that connects one side of the upper portion of the seat back with an opposite side of a lower portion of the seat back, and the first member is more rigid than the second member, and the second member is lighter than the first member,
    each linear portion of the more rigid member is more rigid than each linear portion of the lighter member,
    the engaging portion is provided on the first member, and when the seat back is in an upright position, and in response to tension received from the band member, stress is applied to the engaging portion provided on the first member and a corner portion of the same first member.

11. The vehicle seat according to claim 1, wherein each corner portion of the one of the first member and the second member is more rigid than one corner portion of the other of the first member and the second member.

12. The vehicle seat according to claim 1, wherein the first member or the second member is a singular piece made of a single material.

13. The vehicle seat according to claim 1, wherein the first member or the second member is made of a hollow pipe in its entirety.

14. The vehicle seat according to claim 1, wherein the linear portion and a corner portion of the first member or the second member are made of the same material.

* * * * *